United States Patent
Nabeta et al.

(10) Patent No.: US 9,108,845 B2
(45) Date of Patent: Aug. 18, 2015

(54) CHLORINE PRODUCTION CATALYST AND CHLORINE PRODUCTION PROCESS USING THE CATALYST

(75) Inventors: Takashi Nabeta, Chiba (JP); Nobuhiko Horiuchi, Chiba (JP); Kenichi Sugimoto, Yokohama (JP); Kenji Iwata, Yokohama (JP); Masami Murakami, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 952 days.

(21) Appl. No.: 13/256,623

(22) PCT Filed: Mar. 25, 2010

(86) PCT No.: PCT/JP2010/055279
§ 371 (c)(1),
(2), (4) Date: Sep. 14, 2011

(87) PCT Pub. No.: WO2010/110392
PCT Pub. Date: Sep. 30, 2010

(65) Prior Publication Data
US 2012/0009117 A1    Jan. 12, 2012

(30) Foreign Application Priority Data

Mar. 26, 2009 (JP) ................ 2009-076920
Mar. 26, 2009 (JP) ................ 2009-076921
Mar. 26, 2009 (JP) ................ 2009-076923

(51) Int. Cl.
*C01B 7/00* (2006.01)
*C01B 7/04* (2006.01)
(Continued)

(52) U.S. Cl.
CPC . *C01B 7/04* (2013.01); *B01J 23/83* (2013.01); *B01J 35/002* (2013.01); *B01J 35/08* (2013.01);
(Continued)

(58) Field of Classification Search
CPC ...... B01J 35/002; B01J 35/08; B01J 35/1042; B01J 35/1047; B01J 35/1038; B01J 35/023; B01J 23/83; B01J 37/0045; B01J 37/0201; B01J 21/08; C01B 7/04
See application file for complete search history.

(56) References Cited

U.S. PATENT DOCUMENTS 3,210,158 A    10/1965  Engel et al.
3,260,678 A    7/1966   Engel et al.
(Continued)

FOREIGN PATENT DOCUMENTS

EP    0582165 A1    7/1993
EP    2198959 A1    6/2010
(Continued)

OTHER PUBLICATIONS

GB908022, "A process for the production of chlorine and catalytic compositions suitable for use therein", 1962.*
(Continued)

*Primary Examiner* — Melvin C Mayes
*Assistant Examiner* — Smita Patel
(74) *Attorney, Agent, or Firm* — Foley & Lardner LLP (57) ABSTRACT

The invention provides a chlorine production catalyst that shows excellent reaction activity in the oxidation reaction of hydrogen chloride with oxygen into chlorine, is inexpensive and can be supplied stably, and is suited for use in a fluidized-bed reactor. The invention also provides a chlorine production process using the catalyst. The chlorine production catalyst of the invention includes spherical particles containing copper element (A), an alkali metal element (B) and a lanthanoid element (C) and having an average sphericity of not less than 0.80. The lanthanoid element (C) has a bond dissociation energy with oxygen at 298 K of 100 to 185 kcal/mol. The content of the copper element (A) in the catalyst is 0.3 wt % to 4.5 wt %.

4 Claims, 1 Drawing Sheet

(51) Int. Cl.
    *B01J 23/83* (2006.01)
    *B01J 35/00* (2006.01)
    *B01J 35/08* (2006.01)
    *B01J 35/10* (2006.01)
    *B01J 37/00* (2006.01)
    *B01J 37/02* (2006.01)
    *B01J 21/08* (2006.01)
    *B01J 35/02* (2006.01)

(52) U.S. Cl.
    CPC .......... *B01J 35/1038* (2013.01); *B01J 35/1042* (2013.01); *B01J 35/1047* (2013.01); *B01J 37/0045* (2013.01); *B01J 37/0201* (2013.01); *B01J 21/08* (2013.01); *B01J 35/023* (2013.01)

(56) References Cited

U.S. PATENT DOCUMENTS

| | | | |
|---|---|---|---|
| 3,360,483 | A | 12/1967 | Diamond et al. |
| 3,483,136 | A | 12/1969 | Van Der Plas et al. |
| 3,527,819 | A | 9/1970 | Berkowitz et al. |
| 4,822,589 | A | 4/1989 | Kiyoura et al. |
| 4,828,815 | A | 5/1989 | Kiyoura et al. |
| 5,147,624 | A | 9/1992 | Kiyoura et al. |
| 5,707,919 | A | 1/1998 | Miyata et al. |
| 5,871,707 | A | 2/1999 | Hibi et al. |
| 5,908,607 | A | 6/1999 | Abekawa et al. |
| 7,145,033 | B2 * | 12/2006 | Fiorentino et al. ............ 560/227 |

FOREIGN PATENT DOCUMENTS

| | | |
|---|---|---|
| GB | 1140657 | 1/1969 |
| GB | 1221730 | 2/1971 |
| JP | 38-020358 | 10/1963 |
| JP | 61-275104 | 12/1986 |
| JP | 1-257102 | 10/1989 |
| JP | 5-69043 | 9/1993 |
| JP | 2513756 | 4/1996 |
| JP | 9-117666 | 5/1997 |
| JP | 10-5592 | 1/1998 |
| JP | 3270670 | 1/2002 |
| JP | 3284879 | 3/2002 |
| JP | 3543550 | 4/2004 |
| JP | 3852983 | 9/2006 |
| JP | 2009-248044 | 10/2009 |

OTHER PUBLICATIONS

JP10-005592, machine translation, "Catalyst for producing chlorine from hydrogen chloride", 1998.*
"Shokubai Hannou Souchi to Sono Sekkei (Catalyst Reaction Apparatus and its Design)", Shokubai Kouza (Catalyst Courses) vol. 6, 1985, p. 149.
Search Report mailed May 18, 2010 in International Application No. PCT/JP2010/055279.
Supplementary European Search Report EP Application No. 10756188.8 dated Jan. 7, 2013.
European Office Action dated Sep. 2, 2014 issued in Application No. 10 756 188.8.

* cited by examiner

CHLORINE PRODUCTION CATALYST AND CHLORINE PRODUCTION PROCESS USING THE CATALYST

TECHNICAL FIELD

The present invention relates to a catalyst for producing chlorine from hydrogen chloride, in particular to a chlorine production catalyst suited for use in a fluidized-bed reactor. The invention also relates to a chlorine production process using the catalyst.

BACKGROUND ART

Chlorine is useful as a material for compounds such as vinyl chloride and phosgene. Chlorine is produced by known methods such as electrolysis of salt or catalytic oxidation of hydrogen chloride.

The electrolysis of salt consumes a large amount of electrical power and is thus energetically unfavorable. Further, since it gives caustic soda as a by-product, the balance between supply and demand of chlorine and caustic soda always matters.

On the other hand, the production of chlorine by the catalytic oxidation of hydrogen chloride was developed as a method for recovering hydrogen chloride by-produced in the production of vinyl chloride monomers or isocyanates. Since the by-product hydrogen chloride is used as a raw material, this process is very effective from the viewpoint of environmental load.

The production of chlorine by the oxidation of hydrogen chloride has three types: the electrolysis method, the gas-phase catalytic oxidation method and the non-catalytic oxidation method. The electrolysis method, proposed by UHDE GmbH in the 1960s, produces chlorine and hydrogen by the electrolysis of hydrogen chloride. Although this method has undergone various modifications, a problem still remains in that the method consumes a large amount of electrical power. The gas-phase contact oxidation method, also referred to as the Deacon process, was proposed in the 1860s as a method for producing chlorine from hydrogen chloride and oxygen. This reaction is an exothermic equilibrium reaction, and a lower reaction temperature favors the reaction. Known catalysts for this reaction are, for example, copper-based catalysts, chromium-based catalysts and ruthenium-based catalysts.

For example, known copper-based catalysts are catalysts in which copper chloride, an alkali metal chloride and lanthanoid such as didymium chloride are supported on a silica gel carrier having a specific surface area of not less than 200 $m^2/g$ and an average pore diameter of not less than 60 Å (Patent Literature 1), and catalysts which are prepared by impregnating copper, potassium and didymium in a silica gel having a specific surface area of 410 $m^2/g$ and a pore volume of 0.72 ml/g (Patent Literature 2). Although these catalysts are formed of inexpensive components, they have low reaction activity and should be brought to high temperatures to show sufficient activity. Since the Deacon process is an exothermic equilibrium reaction, the equilibrium conversion of hydrogen chloride is lowered with increasing temperature. Didymium is a mixture containing various rare earth elements. The mixture has a different composition depending on the place and time where it is mined. Accordingly, catalysts containing didymium show varied activity and are disadvantageous in obtaining stable performance.

For example, known chromium-based catalysts are catalysts in which chromia is supported on silicon oxide (Patent Literatures 3 and 4). Similarly to the copper-based catalysts, these catalysts have low reaction activity and are disfavored in obtaining a sufficient equilibrium conversion. Further, the major component chromium adds safety and health problems. Thus, the use of the catalysts constitutes a serious problem in terms of environmental loads.

For example, known ruthenium-based catalysts are supported metallic ruthenium catalysts, ruthenium oxide catalysts and ruthenium composite oxide catalysts (Patent Literatures 5 and 6). These catalysts show sufficient activity even at low temperatures. However, the main component ruthenium is expensive and thus should be recovered from the waste catalysts for reuse. Further, since ruthenium is a rare metal, a growth in demand easily leads to a price increase. Thus, the catalysts have problems in stable supply and costs.

A fluidized-bed process became widely known in the late 19th century. In this process, a reaction or a heat treatment is performed while solid particles are suspended by a fluid. The fluidized-bed process has been practiced also in the oxidation reaction of hydrogen chloride using a chromium-based catalyst. The fluidized-bed process requires that the solid particles show good fluidity continuously during the reaction. A number of studies have been then made with regard to particle properties, apparatus structures and operation conditions. In order that the solid particles keep good fluidity, the catalyst shape should be maintained during the reaction. A drastic change in catalyst shape due to, for example, abrasion or breakage during the reaction invites the scattering of the catalyst components and results in lower reaction activity. However, much is still unknown about the influences of these and other factors on the fluidity, and adequate researches have not been made.

Under this circumstance, the present applicant has found and disclosed that a catalyst having a particle diameter and a specific surface area in the specific ranges shows a small change in activity with time and hardly adheres together even when used in a fluidized bed (Patent Literatures 7 and 8).

However, the industrial chlorine production has still needed a chlorine production catalyst which allows for higher conversion to chlorine, has excellent catalyst life and shows excellent fluidity in the use in a fluidized bed.

CITATION LIST

Patent Literatures

Patent Literature 1: U.S. Pat. No. 3,260,678
Patent Literature 2: U.S. Pat. No. 3,483,136
Patent Literature 3: JP-A-S61-275104
Patent Literature 4: Japanese Patent No. 2513756
Patent Literature 5: Japanese Patent No. 3284879
Patent Literature 6: Japanese Patent No. 3543550
Patent Literature 7: Japanese Patent No. 3270670
Patent Literature 8: Japanese Patent No. 3852983

SUMMARY OF INVENTION

Technical Problem

It is an object of the invention to provide a chlorine production catalyst that shows excellent reaction activity and long catalyst life in the oxidation reaction of hydrogen chloride with oxygen into chlorine, is inexpensive and can be supplied stably, and maintains high fluidity over a long term without adhering together and is thus suited for use in a fluidized-bed reactor. It is another object to provide a chlorine production process using the catalyst. It is a further object of the invention to provide a chlorine production catalyst which does not change its particle shape during the oxidation reaction of hydrogen chloride with oxygen into chlorine and thereby allows for a good reaction yield over a long term.

Solution to Problem

A chlorine production catalyst according to the present invention is a catalyst for producing chlorine by oxidizing hydrogen chloride with oxygen in a fluidized-bed reactor and comprises spherical particles containing copper element (A), an alkali metal element (B) and a lanthanoid element (C) and having an average sphericity of not less than 0.80, the lanthanoid element (C) having a bond dissociation energy with oxygen at 298 K of 100 to 185 kcal/mol, the content of the copper element (A) in the catalyst being 0.3 wt % to 4.5 wt %.

In the chlorine production catalyst, it is preferred that the weight ratio of the copper element (A) and the alkali metal element (B) is in the range of 1:0.2 to 1:4.0, and the weight ratio of the copper element (A) and the lanthanoid element (C) is in the range of 1:0.2 to 1:6.0.

It is also preferable that the weight ratio of the copper element (A) and the alkali metal element (B) is in the range of 1:0.2 to 1:2.0, and the weight ratio of the copper element (A) and the lanthanoid element (C) is in the range of 1:0.2 to 1:3.0.

The lanthanoid element (C) is preferably at least one selected from the group consisting of praseodymium, neodymium, samarium and europium.

The alkali metal(s) (B) preferably is or include(s) at least one selected from the group consisting of sodium and potassium.

The spherical particles preferably have an average sphericity of 0.90 to 1.00.

In the chlorine production catalyst of the invention, it is preferable that the terminal velocity in air calculated by the Stoke's law is 0.10 m/sec to 2.0 m/sec and the particle density is 0.4 g/ml to 1.2 g/ml.

In the chlorine production catalyst of the invention, it is preferable that components including the copper element, the alkali metal element and the rare earth metal element are supported on a carrier.

A chlorine production process according to the present invention comprises oxidizing hydrogen chloride with oxygen in a fluidized-bed reactor in the presence of the inventive chlorine production catalyst.

A fluidized-bed reactor according to the present invention comprises the inventive chlorine production catalyst.

Advantageous Effects of Invention

The chlorine production catalyst according to the invention shows excellent reaction activity and long catalyst life in the oxidation reaction of hydrogen chloride with oxygen into chlorine, is inexpensive and can be supplied stably, and has excellent fluidity stability, namely maintains high fluidity over a long term without adhering together and is thus suited for use in a fluidized-bed reactor. Further, the chlorine production catalyst of the invention provides advantages that the catalyst particles show good fluidity when used in a fluidized-bed reactor, and further that the catalyst is lightweight, easily handled and inexpensive and can be used stably for a long term. According to the process of the invention, chlorine can be produced continuously, efficiently and economically using the catalyst.

DESCRIPTION OF EMBODIMENTS

Hereinbelow, the present invention will be described in detail.

(Chlorine Production Catalysts)

A chlorine production catalyst according to the present invention is a catalyst for producing chlorine by oxidizing hydrogen chloride with oxygen and includes spherical particles containing copper element (A), an alkali metal element (B) and a specific lanthanoid element (C). The spherical particles have an average sphericity of not less than 0.80.

That is, the chlorine production catalyst of the invention contains copper element (A), an alkali metal element (B) and a specific lanthanoid element (C) as active components.

The copper element (A) contained in the chlorine production catalyst may have a valence of 1 or 2. The content of the copper element is 0.3 wt % to 4.5 wt %, preferably 0.5 wt % to 3.5 wt %, and more preferably 0.5 wt % to 3.0 wt % based on 100 wt % of the catalyst. If the copper content exceeds 4.5 wt %, the fluidity of the individual catalyst particles is deteriorated. If the copper content is less than 0.3 wt %, a sufficient chlorine yield cannot be obtained.

Examples of the alkali metal elements (B) contained in the chlorine production catalysts include lithium, sodium, potassium, rubidium, cesium and francium. The catalyst may contain a single alkali metal element (B) or two or more kinds in combination. Of these alkali metals, sodium and/or potassium is preferable, and potassium is more preferable. The content of the alkali metal elements (B) is not particularly limited, but is preferably 0.1 wt % to 5.0 wt %, more preferably 0.2 wt % to 4.0 wt %, and still more preferably 0.3 wt % to 3.0 wt % based on 100 wt % of the chlorine production catalyst.

Of the lanthanoid elements with atomic numbers 57 to 71, the lanthanoid elements (C) contained in the chlorine production catalyst include those having a bond dissociation energy with oxygen at 298 K of 100 to 185 kcal/mol. Table 1 describes the bond dissociation energy of the lanthanoids with oxygen at 298 K. Specifically, the lanthanoid element (C) contained in the chlorine production catalyst is at least one selected from praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm) and lutetium (Lu).

TABLE 1

| Ln-O bond dissociation energy $[D_{298}]$ (kcal/mol) | | | | | | | | | | | | | | |
| --- | --- | --- | --- | --- | --- | --- | --- | --- | --- | --- | --- | --- | --- | --- |
| La | Ce | Pr | Nd | Pm | Sm | Eu | Gd | Tb | Dy | Ho | Er | Tm | Yb | Lu |
| 191 | 190 | 180 | 168 | 161 | 135 | 115 | 172 | 170 | 145 | 146 | 147 | 120 | 95 | 162 |

The Ln-O (lanthanoid-oxygen) bond dissociation energy values $D_{298}$ at 298 K illustrated in Table 1 are the data described in Table 2, p. 223, of Yuuki Kinzoku Hannouzai Handbook (Organic Metal Reagent Handbook) (edited and written by Kohei Tamao, Kagaku-Dojin Publishing Co., Inc., published in June, 2003).

In the invention, a bond dissociation energy in excess of 185 kcal/mol results in an excessively strong bond of the lanthanoid element (C) with oxygen, and a bond dissociation energy below 100 kcal/mol does not allow sufficient affinity for oxygen. In either case, a sufficient reaction activity (hydrogen chloride conversion) may not be obtained.

Of the lanthanoid elements (C), praseodymium, neodymium, samarium, europium, gadolinium and dysprosium are preferable. From the viewpoints of the balance between the conversion of hydrogen chloride to chlorine and the fluidity stability, praseodymium, neodymium, samarium and europium are more preferable. The lanthanoid elements (C) may be used singly, or two or more kinds may be used in combination.

The content of the lanthanoid elements (C) is not particularly limited, but is preferably 0.3 wt % to 10.0 wt %, more preferably 0.5 wt % to 7.0 wt %, and still more preferably 0.5 wt % to 5.0 wt % based on 100 wt % of the chlorine production catalyst.

The chlorine production catalysts of the invention may contain the copper element (A), the alkali metal element (B) and the lanthanoid element (C) in any weight ratio without limitation. In a preferred embodiment, the weight ratio of the copper element (A) and the alkali metal element (B) is in the range of 1:0.2 to 1:4.0, and the weight ratio of the copper element (A) and the lanthanoid element (C) is in the range of 1:0.2 to 1:6.0. In a more preferred embodiment, the weight ratio of the copper element (A) and the alkali metal element (B) is in the range of 1:0.2 to 1:2.0, and the weight ratio of the copper element (A) and the lanthanoid element (C) is in the range of 1:0.2 to 1:3.0. Still more preferably, the weight ratio of the copper element (A) and the alkali metal element (B) is 1:0.3 to 1:1.5, and the weight ratio of the copper element (A) and the lanthanoid element (C) is 1:0.3 to 1:2.5. Most preferably, the weight ratio of the copper element (A) and the alkali metal element (B) is 1:0.4 to 1:1.0, and the weight ratio of the copper element (A) and the lanthanoid element (C) is 1:0.4 to 1:2.0. These preferred weight ratios ensure that the elements as the active components easily form a composite and the obtainable chlorine production catalyst has a long life and excellent activity.

The chlorine production catalyst of the invention is in the form of spherical particles in which the copper element (A), the alkali metal element (B) and the lanthanoid element (C) as active components are usually supported on a carrier that is a porous, spherical particulate carrier. The carrier for constituting the chlorine production catalyst of the invention should permit the active components to be dispersed therein and supported thereon and should have corrosion resistance against decomposition with hydrochloric acid or chlorine.

The carrier desirably has an average particle diameter of 10 μm to less than 1000 μm, preferably 30 μm to less than 600 μm, and more preferably 50 μm to less than 300 μm.

The average of the pore diameters of the carrier (hereinafter, referred to as the average pore diameter) is preferably 3 nm to 50 nm, and more preferably 6 nm to 30 nm. If the average pore diameter is less than 3 nm, introducing the metal components including copper into the pores is difficult and such components will be caused to aggregate on the surface or clog the pores. An average pore diameter exceeding 50 nm leads to a small surface area of the carrier and consequently the reaction efficiency is lowered.

The carrier preferably has a specific surface area of 30 $m^2/g$ to 1000 $m^2/g$, more preferably 50 $m^2/g$ to 500 $m^2/g$, and still more preferably 100 $m^2/g$ to 300 $m^2/g$. If the specific surface area is less than 30 $m^2/g$, the number of reaction sites is unfavorably decreased. Carriers having a specific surface area in excess of 1000 $m^2/g$ require a special technique for production and are therefore unfavorable from the viewpoint of production costs. The specific surface area in the invention is measured with a BET specific surface area analyzer (BELSORP-max manufactured by BEL JAPAN INC.).

The carrier preferably has a bulk density of 0.20 g/ml to 1.00 g/ml, and more preferably 0.30 g/ml to 0.80 g/ml.

Further, the carrier preferably has a pore volume of 0.5 ml/g to 3.0 ml/g, and more preferably 0.5 ml/g to 2.0 ml/g. If the pore volume is less than 0.5 ml/g, the space in the pores is not sufficient and the reaction efficiency may be lowered. If the pore volume is in excess of 3.0 ml/g, the strength of the carrier is lowered and the catalyst may be broken during the reaction.

The carrier materials include silica, silica alumina, alumina, titania and zirconia. Of these, silica is preferable because of its high strength which allows for a long life of the catalyst. Examples of the silica carriers include commercially available silica gels and fumed silicas. The carrier content in the chlorine production catalyst is generally 98 to 65 wt %, preferably 97 to 69 wt %, and more preferably 94 to 72 wt % based on 100 wt % of the catalyst. This carrier content ensures good activity and high strength of the chlorine production catalyst.

The chlorine production catalyst of the invention exhibits excellent abrasion resistance and durability as well as good fluidity when the catalyst is almost spherical. That is, the catalyst has a spherical particulate shape with an average sphericity of not less than 0.80, and preferably not less than 0.90. If the sphericity is less than 0.80, the frictional abrasion of the particles and the consequent degradation are non-negligible, and the fluidity during the reaction is deteriorated. Unless good fluidity is ensured, the reaction efficiency is lowered and the productivity is deteriorated as a result. The upper limit of the average sphericity is 1. When the average sphericity is 1, the catalyst is completely spherical.

The average sphericity of the spherical particles is an average value of sphericity coefficients (sphericity values of the spherical particles) determined with respect to a microscopic image such as a scanning electron microscopic (SEM) image. The average is preferably based on the data of at least 1000 particles.

The sphericity is obtained from the perimeter and area of each particle in the microscopic image based on the equation:

$$4 \times \pi \times area/(perimeter \times perimeter)$$

The sphericity is closer to 1 as the particle image is more spherical.

In detail, the average sphericity of the spherical particles in Examples and Comparative Examples described later was determined in the following manner.

1. A measurement sample is fixed on a sample table via an adhesive tape and is photographed by scanning electron microscopy (SEM).

2. The SEM image is imported into an image analyzer. The sphericity (sphericity coefficient) of each of the particles is then measured, and the average sphericity of the analyzed particles is calculated. The analysis herein involves particles having a pseudo-circle diameter of 30 μm or more. As described above, the number of the particles analyzed is desirably 1000 or more.

In the invention, the following apparatuses are used for the measurement.

Scanning electron microscope (SEM): S-4800 manufactured by Hitachi High-Technologies Corporation
    accelerating voltage: 30 kV, emission current: 20 μA, magnification: ×30

Image analyzer: Leica Q-win manufactured by Leica Microsystems Japan

The spherical particulate shape of the chlorine production catalyst in the invention may be formed by any methods without limitation. For example, the active components may be supported on a spherical particulate carrier. Alternatively, a carrier supporting the active components may be polished. However, since the shape of the catalyst particles usually depends directly on the shape of the carrier, it is preferable to use a spherical particulate carrier to constitute the chlorine production catalyst of the invention. More preferably, a spherical particulate carrier is used which has an average sphericity of not less than 0.80, and still more preferably not less than 0.90. The upper limit of the average sphericity is 1.

In the case where the catalyst particles have a shape that is not spherical or is low in sphericity, the frictional abrasion of the particles and the consequent degradation are non-negligible, and the fluidity during the reaction is possibly deteriorated. Unless good fluidity is ensured, the reaction efficiency is lowered and the productivity is possibly deteriorated as a result.

The chlorine production catalyst of the invention may contain a component (additional component) other than the active components and the carrier. Such additional components include palladium, iridium, chromium, vanadium, niobium, iron, nickel, aluminum, molybdenum, tungsten and alkaline earth metals. These additional components may be contained at 0.001 to 10 parts by weight, and preferably 0.01 to 10 parts by weight based on 100 parts by weight of the carrier.

The chlorine production catalyst of the invention may contain one, or two or more kinds of other rare earth elements such as lanthanum, cerium, ytterbium, scandium and yttrium while still achieving the objects of the invention. Although these additional elements may be used appropriately as long as the objects of the invention are achieved, the amount thereof is preferably 0.001 wt % to 10 wt % based on 100 wt % of the chlorine production catalyst. The weight ratio of the lanthanoid element (C) and the additional rare earth element(s) is not particularly limited, but is preferably in the range of 1:0 to 1:9.0, and more preferably 1:0 to 1:4.0.

The average particle diameter of the chlorine production catalyst is not particularly limited, but may be desirably 10 μm to less than 1000 μm, preferably 30 μm to less than 600 μm, and more preferably 50 μm to less than 300 μm.

The average pore diameter of the chlorine production catalyst is not particularly limited, but may be preferably 3 nm to 50 nm, and more preferably 6 nm to 30 nm. If the average pore diameter is less than 3 nm, introducing the metal components including copper into the pores is difficult and such components will be caused to aggregate on the surface or clog the pores. An average pore diameter exceeding 50 nm leads to a small surface area of the catalyst and consequently the reaction efficiency may be lowered.

The specific surface area of the chlorine production catalyst is not particularly limited, but may be preferably 30 m$^2$/g to 1000 m$^2$/g, more preferably 50 m$^2$/g to 500 m$^2$/g, and still more preferably 100 m$^2$/g to 300 m$^2$/g. The specific surface area in the invention is measured with a BET specific surface area analyzer (BELSORP-max manufactured by BEL JAPAN INC.).

The bulk density of the chlorine production catalyst is not particularly limited, but may be preferably 0.20 g/ml to 1.00 g/ml, and more preferably 0.30 g/ml to 0.80 g/ml.

Further, the pore volume of the chlorine production catalyst is not particularly limited, but may be preferably 0.3 ml/g to 3.0 ml/g, more preferably 0.5 ml/g to 2.0 ml/g, and still more preferably 0.6 ml/g to 1.5 ml/g. If the pore volume is less than 0.3 ml/g, the space in the pores is not sufficient and the substrate cannot be diffused sufficiently, and further the specific surface area is reduced to lower the reaction efficiency. If the pore volume is in excess of 3.0 ml/g, the strength of the catalyst is lowered and the catalyst may be broken during the reaction.

The particle density of the chlorine production catalyst is not particularly limited, but may be preferably 0.4 g/ml to 1.2 g/ml, and more preferably 0.6 g/ml to 1.0 g/ml. The catalyst having this particle density is lightweight, easily handled and inexpensive and can be used stably for a long term.

In the invention, the particle density Z (g/ml) is calculated by the following equation from the true density X (g/ml) and the pore volume Y (ml/g) of the particles.

$$Z=1/(1/X+Y)$$

Furthermore, the chlorine production catalyst of the invention preferably has a terminal velocity in air calculated by the Stoke's law that is 0.05 m/sec to 2.0 m/sec, more preferably 0.10 m/sec to 1.5 m/sec, and still more preferably 0.15 m/sec to 1.0 m/sec. When the terminal velocity calculated by the Stoke's law is in this range, the catalyst shows higher fluidity when used in a reaction in a fluidized-bed reactor.

Herein, the terminal velocity of the catalyst is a terminal velocity in air that is calculated by the Stoke's law. It can be obtained from the following equation (see Shokubai Kouza (Catalyst Courses) Vol. 6, "Shokubai Hannou Souchi to Sono Sekkei (Catalyst reaction apparatus and its design)", p. 149, Equation (3.116), (edited and written by Catalysis Society of Japan, Kodansha Ltd.)).

$$\text{Terminal velocity } u_t = g(\rho_s - \rho_g) d_p^2 / 18\mu$$

(wherein g: gravity acceleration, $\rho_s$: particle density, $\rho_g$: gas density, $d_p$: average particle diameter, μ: gas viscosity).

The chlorine production catalyst of the invention may be produced by any processes without limitation. For example, it may be prepared by the following process.

An exemplary process for producing the chlorine production catalyst according to the invention includes a step of dispersing a copper compound, an alkali metal compound and a lanthanoid compound in a spherical particulate carrier, and a step of drying or calcining the carrier in which the copper compound, the alkali metal compound and the lanthanoid compound are dispersed.

Where necessary, the above catalyst production process may further include a step of crushing the catalyst, or a step of classifying the catalyst to a specific particle diameter.

In the process for manufacturing the chlorine production catalyst, the active components, namely the copper element (A), the alkali metal element (B) and the specific lanthanoid element (C) are dispersed in the carrier as a copper compound, an alkali metal compound and a lanthanoid compound, respectively. A preferred catalyst is as described hereinabove. For example, a spherical particulate carrier having an average sphericity of not less than 0.80, and preferably not less than 0.90 is preferable because the obtainable catalyst achieves a long life.

The active components may be dispersed in the carrier and supported thereon by any methods without limitation. Exemplary methods include depositing the above elements in a vacuum chamber, gas-phase supporting and liquid-phase supporting (liquid-phase preparation method). In view of operation properties and dispersion uniformity, liquid-phase supporting is preferable. In the case of liquid-phase supporting, the compounds containing the active components may be added to a solvent to give a material solution or a material dispersion in which the materials are dispersed in the solvent, and the solution or the dispersion may be sprayed to the catalyst carrier. Alternatively, the catalyst carrier may be soaked in the material solution or the material dispersion, and the material solution or the material dispersion may be evaporated to dryness while performing stirring. Still alternatively, the catalyst carrier may be soaked in the material solution or the material dispersion containing the active components, then lifted therefrom, and dried.

When the amount of the active components dispersed and supported by soaking the catalyst carrier in the material solution or the material dispersion is small, the catalyst carrier may be soaked again in the material solution or the material dispersion to increase the contents of the active components. The active components in the material solution or the material dispersion may remain undissolved and in the solid state as long as they are small enough to enter the pores of the carrier. However, in order that the active components are homogeneously dispersed into the pores, the active components are preferably dissolved in the solvent, namely, the material solution is preferable.

In spraying to the catalyst carrier the material solution or the material dispersion in which the materials are dispersed in the solvent, it is preferable that the volume of the material dispersion is not more than the pore volume of the catalyst carrier. A volume of the material dispersion that is larger than the pore volume of the catalyst carrier is not preferable because the material dispersion overflows from the pores in the catalyst carrier and resides on the surface of the catalyst carrier.

The solvents for use in supporting the active components in the liquid phase are not particularly limited as long as the compounds containing the active components are dissolved or dispersed therein. Water is preferable in view of easy handling. The concentration of the active components dissolved or dispersed in the solvent is not particularly limited as long as the compounds containing the active components are homogeneously dissolved or dispersed. However, supporting the active components is time-consuming when the concentration is excessively low. Therefore, the concentration of the active components is preferably 1 to 50 wt %, and more preferably 2 to 40 wt % based on 100 wt % of the active components and the solvent combined.

If the solvent remains in a volume larger than the pore volume of the catalyst carrier after the active components are dispersed, the catalyst should be desolvated before packed in a reactor. If the volume of the residual solvent is equal to or less than the pore volume, the catalyst may be used with or without desolvation. The desolvation may be achieved by drying alone or further by calcination. The drying conditions are not particularly limited, but the drying is generally carried out at atmospheric pressure or reduced pressure at 0 to 200° C. for 10 minutes to 24 hours. The calcination conditions are not particularly limited, but the calcination is usually carried out at atmospheric pressure at 200° C. to 600° C. for 10 minutes to 24 hours.

The copper compound, the alkali metal compound and the lanthanoid compound that are dispersed in the carrier are not particularly limited. They are usually each independently a halide, a nitrate, a sulfate, an acetate, a carbonate, an oxalate, an alkoxide or a complex salt. Of these, chlorides, nitrates and acetates are preferable because of easy formation of the composite salt.

The amounts of the copper compound, the alkali metal compound, the lanthanoid compound and the carrier may vary depending on how the components are supported. The amounts are preferably such that the obtainable catalyst will contain the copper element (A), the alkali metal element (B) and the lanthanoid element (C) in the aforementioned amounts.

The shape of the catalyst obtained by the above production process usually depends on the shape of the carrier. However, after the active components are supported on the carrier and the catalyst is dried and calcined as required, the catalyst may be shaped to a spherical particulate form by, for example, crushing or polishing the particles or breaking the aggregated particles.

When a silica carrier is used, a commercial product may be used directly. However, such silica may be used after dried or calcined at 30 to 700° C. before the active components are supported thereon.

In addition to the copper compound, the alkali metal compound and the lanthanoid compound, other compounds may be dispersed in the carrier by any methods without limitation. Examples of such compounds include rare earth compounds other than the lanthanoid compounds in the invention, palladium compounds, iridium compounds, chromium compounds, vanadium compounds, niobium compounds, iron compounds, nickel compounds, aluminum compounds, molybdenum compounds, tungsten compounds and alkaline earth metal compounds. For example, these compounds may be dispersed in the carrier as a solution together with the copper compound, the alkali metal compound and the lanthanoid compound. Alternatively, these compounds may be separately dispersed in the carrier before or after the active components. A catalyst that contains the active components and components other than the active components and the carrier may be thus obtained. When the catalyst of the invention contains these additional components, the total amount of the additional components is usually in the range of 0.001 to 10 parts by weight, and preferably 0.01 to 10 parts by weight in terms of the metal elements based on 100 parts by weight of the carrier.

The chlorine production catalyst of the invention is usually a collection of spherical particles, and the particles may each have a substantially uniform composition or the particles as a whole may satisfy the above-described specific properties. The chlorine production catalyst of the invention is preferably a collection consisting solely of spherical particles having an identical composition. In an embodiment, however, the chlorine production catalyst may be a mixture of spherical particles which have different compositions but as a whole satisfy the above-described specific properties. The chlorine production catalyst that is a mixture of spherical particles having different compositions should be a collection of spherical particles which differ in composition or properties but as a whole satisfy the properties defined for the chlorine production catalyst in the invention. An example of such a chlorine production catalyst is a mixture of spherical particles that contain the copper element (A), the alkali metal element (B) and the specific lanthanoid element (C), and spherical particles (P) that are inert in the hydrogen chloride oxidation reaction (also referred to as the inert particles (P)). The use of the inert particles (P) in the invention enables maintaining a high fluidity for a longer term, and thereby chlorine can be produced more stably. The materials of the inert spherical particles (P) which may be contained in the chlorine production catalyst of the invention are not particularly limited as long as the particles do not have reactivity with the reactants (hydrogen chloride and oxygen) and the products (chlorine and water). Exemplary materials include silica, silica alumina, alumina, titania, zirconia and glass. Of these, silica and alumina are preferable, and silica is particularly preferable. In an embodiment, the inert particles (P) may be the carrier without supporting the catalytic components. The inert particles (P) may have any shape that is common for fluidized-bed catalysts, with examples including particulate shapes, granular shapes and spherical shapes. To suppress abrasion during the reaction, spherical particles are preferable, and spherical particles having an average sphericity of not less than 0.80 are more preferable.

In the invention, the content of the copper element (A) is 0.3 wt % to 4.5 wt % based on 100 wt % of the catalyst. However, even the spherical particles which contain the copper element (A) in a content outside the above range are still within the scope of the chlorine production catalysts of the invention as long as the mixing of the inert particles (P) with the catalyst adjusts the content of the copper element (A) to fall in the above range based on 100 wt % of the catalyst while still achieving the objects of the invention.

The chlorine production catalyst of the invention may be suitably used to catalyze the oxidation of hydrogen chloride with oxygen into chlorine in a fluidized-bed reactor. The catalysts show excellent catalytic activity and long catalyst life, can be supplied inexpensively and stably, and maintain excellent fluidity over a longterm without adhering together. Further, the chlorine production catalysts have high sphericity and consequent high particle strength. As a result, the particles are resistant to cracks or breakage and show excellent abrasion resistance. Thus, the chlorine production catalysts of the invention enable stable, continuous, efficient and more economic production of chlorine over a long term.

(Chlorine Production Processes)

Next, a chlorine production process using the chlorine production catalyst according to the invention will be described.

The chlorine production process according to the present invention includes oxidizing hydrogen chloride with oxygen to chlorine in a fluidized-bed reactor in the presence of a catalyst. The catalyst used herein is the inventive chlorine production catalyst described above.

The chlorine production process of the invention involves a fluidized-bed reactor. The reaction mode is preferably a flow mode because continuous chlorine production is possible. Since the reaction is an equilibrium reaction, the conversion is lowered if the reaction temperature is excessively high, and the catalytic activity is insufficient if the reaction temperature is excessively low. Thus, the reaction temperature is generally in the range of 250° C. to less than 500° C., and preferably 320° C. to less than 420° C. In view of operation properties, the pressure during the reaction is favorably from atmospheric pressure to less than 50 atm.

The oxygen source for the oxygen used in the reaction may be air. However, pure oxygen is more preferable because the oxygen partial pressure may be controlled easily. Further, since the oxidation reaction of hydrogen chloride with oxygen into chlorine is an equilibrium reaction, the conversion does not reach 100%, and chlorine that is produced should be separated from the unreacted hydrogen chloride. The stoichiometric molar ratio of hydrogen chloride to oxygen (hydrogen chloride/oxygen) is 4. However, because the oxygen supply in excess over the theoretical amount generally provides higher activity and good fluidity, the molar ratio of hydrogen chloride to oxygen (hydrogen chloride/oxygen) is preferably from 0.5 to less than 3.0, and more preferably from 1.0 to less than 2.5. Where necessary, a gas other than hydrogen chloride and oxygen may be passed through the reactor.

At the initiation or the completion of the reaction, stable operation is achieved by lowering the hydrogen chloride to oxygen molar ratio or increasing the space velocity.

The material gas may contain impurity gases in addition to hydrogen chloride and oxygen that are the materials for chlorine. The impurities are, although not particularly limited, for example chlorine, water, nitrogen, carbon dioxide, carbon monoxide, hydrogen, carbonyl chloride, aromatic compounds, sulfur-containing compounds and halogen-containing compounds. In particular, carbon monoxide, which is known to lower the catalytic activity of the conventional catalysts, does not cause a marked lowering in catalytic activity in the use of the inventive catalyst, and the catalyst maintains sufficient activity even in the presence thereof. The carbon monoxide concentration in the material gas is preferably less than 10.0 vol %, and more preferably less than 6.0 vol %. If the concentration is 10.0 vol % or above, the oxidation reaction of carbon monoxide proceeds remarkably to cause problems such as excessive heat generation and lower conversion of hydrogen chloride.

The supply rate of hydrogen chloride relative to the weight of the chlorine production catalyst used is preferably 100 NL/hr to less than 2000 NL/hr, and more preferably 200 NL/hr to less than 1000 NL/hr per 1 kg of the catalyst.

The gas space velocity in the invention is preferably 0.01 m/sec to 1.0 m/sec, and more preferably 0.02 m/sec to 0.5 m/sec. If the gas space velocity is less than 0.01 m/sec, the catalyst cannot flow sufficiently and the fluidity is deteriorated. If the gas space velocity is in excess of 1.0 m/sec, the catalyst may be scattered from the reactor. The gas space velocity is preferably not more than the terminal velocity of the catalyst described hereinabove. If the terminal velocity of the catalyst is lower than the gas space velocity, a marked scattering of the catalyst from the reactor may be caused.

In the chlorine production process of the invention, the production steps are not particularly limited but preferably include the following steps.

(1) A step of heating beforehand the material gas containing hydrogen chloride and oxygen.

(2) A step of oxidizing hydrogen chloride.

(3) A step of cooling the formed gas containing hydrogen chloride, oxygen, chlorine and water.

(4) A step of recovering and removing hydrogen chloride from the formed gas.

(5) A step of dehydrating the formed gas.

(6) A step of compressing and cooling the formed gas, and separating chlorine as liquefied chlorine.

In the step of heating beforehand the material gas containing hydrogen chloride and oxygen, the gas is preferably heated to a temperature of 100° C. to less than 400° C., and more preferably 150° C. to less than 350° C. before it is introduced into a fluidized-bed reactor. If the preheating temperature is below 100° C., the hydrogen chloride gas may be condensed in the system to corrode the apparatus.

In the step of cooling the formed gas containing hydrogen chloride, oxygen, chlorine and water, the formed gas that contains chlorine and water produced in the reactor as well as unreacted hydrogen chloride and oxygen, having a temperature of approximately 250° C. to 500° C., is cooled with a refrigerant. The refrigerant is not particularly limited, but water is preferable.

In the step of recovering and removing hydrogen chloride from the formed gas, the object is to recover and remove unreacted hydrogen chloride from the formed gas containing hydrogen chloride, oxygen, chlorine and water. The methods for recovering and removing hydrogen chloride are not particularly limited. In a preferred embodiment, hydrogen chloride is absorbed in a recovery medium. The recovery media are not particularly limited, but water is preferable because of easy handling. The step of cooling the formed gas and the step of absorbing hydrogen chloride may be carried out using separate apparatuses or may be performed in a single apparatus.

The step of dehydrating the formed gas is aimed at removing water from the formed gas that contains chlorine, oxygen and water. The dehydration methods are not particularly limited. Suitable methods include refrigeration dehydration, absorption dehydration, adsorption dehydration and compression dehydration. An absorption dehydration method is particularly preferable. Through this step, the residual water in the formed gas is removed substantially completely.

In the step of compressing and cooling the formed gas and separating chlorine as liquefied chlorine, the formed gas that has been dehydrated in the previous step is compressed and cooled, and thereby chlorine is liquefied and separated from the gas phase. Here, the gas phase after the liquefaction and separation of chlorine contains oxygen and unrecovered chlorine. This oxygen-containing gas may be re-introduced into the step (1) of heating beforehand the material gas containing hydrogen chloride and oxygen. That is, the gas may be reused to constitute the material gas in the step (2) of oxidizing hydrogen chloride.

Through these steps, high-purity chlorine may be produced continuously and efficiently.

The chlorine production process of the invention may be catalyzed exclusively by the inventive chlorine production catalyst containing the copper element (A), the alkali metal element (B) and the lanthanoid element (C). In an embodiment, the spherical particles (P) that are inert in the hydrogen chloride oxidation reaction may be present in the reactor together with the inventive chlorine production catalyst to improve fluidity. In such an embodiment, the proportion of the inert particles (P) is not particularly limited, but may be 1 wt % to 80 wt %, preferably 2 wt % to 50 wt %, and more preferably 2 wt % to 40 wt % based on the total of the chlorine production catalyst and the inert particles. If the addition amount of the inert particles is less than 1 wt %, the fluidity improvement effect may be lowered. In excess of 80 wt %, the conversion of hydrogen chloride may be lowered. The inert particles (P) are as described hereinabove.

In the chlorine production process of the invention, the catalyst may be withdrawn from the fluidized-bed reactor, or the catalyst or the inert particles may be charged into the fluidized-bed reactor while performing the reaction. That is, the concentration of the copper element (A) in the fluidized-bed reactor may be controlled easily while still achieving the objects of the invention. However, the concentration of the copper element (A) in the fluidized-bed reactor is preferably maintained in the range of 0.3 wt % to 4.5 wt % based on 100 wt % of the catalyst.

According to the inventive chlorine production processes using a fluidized-bed reactor, the chlorine production catalyst shows high catalytic activity and long catalyst life and exhibits excellent fluidity in the fluidized-bed reactor. As a result, chlorine may be produced stably, continuously, efficiently and more economically over a long term.

EXAMPLES

The present invention will be described in detail by presenting examples hereinbelow without limiting the scope of the invention.

The catalysts obtained in Examples and Comparative Examples were tested to evaluate the catalytic activity by the catalytic reaction testing method described below unless otherwise specified. Further, properties were measured and evaluated in the following manners in Examples and Comparative Examples.

[1] Catalytic Reaction Testing Method

Figure 1:
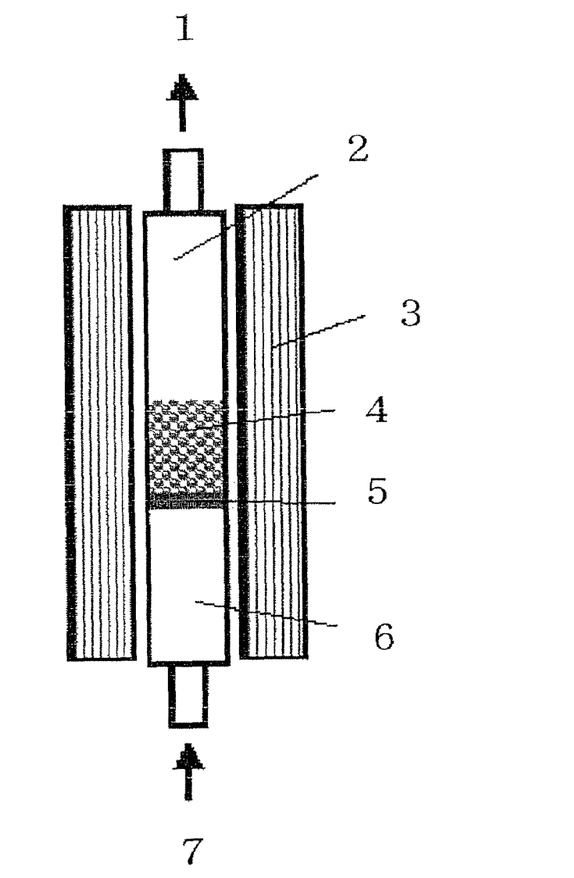
FIG. 1 is a schematic view illustrating a glass reaction tube used for the evaluation of the catalytic activity in Examples and Comparative Examples.

Quartz sand was placed in a bottom portion of a glass reaction tube 16 mm in inner diameter (see FIG. 1) in which a 3 mm thick glass filter was provided in a hollow section. 21.5 ml of the catalyst was packed on the glass filter in the glass reaction tube. Hydrogen chloride and oxygen were supplied at 90.0 Nml/min and 45.0 Nml/min, respectively, from the bottom of the glass reaction tube. While the catalyst was fluidized by the gas, the reaction was carried out at atmospheric pressure and a reaction temperature of 380° C. At this time, the gas space velocity was 2.8 cm/sec, and the hydrogen chloride supply rate per 1 kg of the catalyst was approximately 600 NL/hr.

[2] Conversion of Hydrogen Chloride

Potassium iodide (a reagent for oxidant measurement, KANTO CHEMICAL CO., INC.) was dissolved in water to give a 0.2 mol/l solution. The formed gas from the reaction tube was absorbed in 300 ml of this solution for 8 minutes. The solution was then titrated using a 0.1 mol/l sodium thiosulfate solution (KANTO CHEMICAL CO., INC.) to determine the amount of chlorine produced, thereby measuring the conversion of hydrogen chloride.

[3] Evaluation of Catalyst Fluidity

Hydrogen chloride was oxidized in the same manner as described in the catalytic reaction testing method, except that the reaction temperature was changed to 360° C. The temperature difference was measured between the lower part of the catalyst layer, namely the part in contact with the glass filter, herein referred to as the part A, and the part that was 40 mm above the glass filter, herein referred to as the part B. When the temperature difference between A and B was less than ±2° C., the fluidity was evaluated to be good. When the difference was ±2° C. or more, the fluidity was evaluated to be bad.

[4] Measurement of Average Particle Diameter ($d_p$)

The average particle diameter was usually measured by the following method.

Apparatus: particle size distribution analyzer Microtrac MT3300EXII (manufactured by Microtrac)

Measurement principle: laser diffraction scattering method (wet process)

Measurement range: 0.021 to 1408 μm

Particle conditions:

Transmission: transmissive

Refractive index: 1.81

Shape: non-spherical

[5] Measurement of Average Sphericity

The average sphericity was measured in the following manner.

1. A measurement sample was fixed on a sample table via an adhesive tape and was photographed by scanning electron microscopy (SEM).

2. The SEM image was imported into an image analyzer. The sphericity (sphericity coefficient) of each of the particles was then measured, and the average sphericity of the analyzed particles was calculated. The analysis herein involved particles having a pseudo-circle diameter of 30 μm or more. At least 1000 particles were analyzed.

The following apparatuses and conditions were used for the measurement.

Scanning electron microscope (SEM): S-4800 manufactured by Hitachi High-Technologies Corporation accelerating voltage: 30 kV, emission current: 20 μA, magnification: ×30

Image analyzer: Leica Q-win manufactured by Leica Microsystems Japan

[6] Measurement of Particle Density ($\rho_s$)

The particle density was measured as follows.

1. The true density X (g/ml) was measured by the following method.

Apparatus: dry automatic densimeter Accupyc 1330 (Shimadzu Corporation)

Gas: helium

Measurement temperature: 25° C.

Measurement procedures: After the sample was charged, the pycnometer was purged (with helium) 20 times and the measurement was performed 10 times continuously.

2. Pore volume Y (ml/g) was measured by the following method.

Apparatus: Autosorb 3 (manufactured by Quantachrome Instruments)

Pretreatment: vacuum deaeration at room temperature

Measurement method: nitrogen gas adsorption method (BJH method) at the liquid nitrogen temperature (77K)

3. The particle density Z (g/ml) was calculated by the following equation from the true density X (g/ml) and the pore volume Y (ml/g) measured above.

$$Z=1/(1/X+Y)$$

[7] Terminal Velocity

The terminal velocity (m/sec) of the catalyst was determined by the following equation.

Terminal velocity $u_t = g(\rho_s - \rho_g)d_p^2/18\mu$

In the determination of the terminal velocity in Examples and Comparative Examples, the particle density ($\rho_s$) and the average particle diameter ($d_p$) measured above were used, the gas was assumed to be air at 20° C., the gas density was 1.2 kg/m$^3$, the gas viscosity was 0.018 mPa·s, and the gravity acceleration was 9.807 m/s$^2$.

Example 1

Spherical silica (Q-15 manufactured by FUJI SILYSIA CHEMICAL LTD., particle size distribution: 75 to 500 μm, properties described in the analysis sheet from the manufacturer: average pore diameter 15 nm, average particle diameter 200 μm, bulk density 0.4 g/ml, pore volume 1.2 ml/g) as a carrier (this silica will be referred to as silica carrier 1) was calcined at 500° C. in air for 2 hours. Separately, a glass flask (1 L) was charged with 150 g of water, 2.89 g of cupric chloride (special grade, Wako Pure Chemical Industries Ltd.), 3.20 g of neodymium chloride hexahydrate (special grade, Wako Pure Chemical Industries Ltd.) and 1.53 g of potassium chloride (special grade, Wako Pure Chemical Industries Ltd.). These compounds were formed into an aqueous solution. The calcined silica carrier 1 weighing 50.0 g was added to the aqueous solution, and the liquid was evaporated to dryness at 80° C. in a rotary evaporator. The residue was then calcined in air at 250° C. for 3 hours, thereby obtaining a supported catalyst 1. The supported catalyst 1 had a copper element concentration of 2.5 wt %, a potassium element concentration of 1.5 wt % and a neodymium element concentration of 2.5 wt %. The average sphericity was 0.918, the average particle diameter was 213.4 μm, the particle density was 0.683 g/ml, and the terminal velocity calculated by the Stoke's law was 0.940 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 2

A supported catalyst 2 was prepared in the same manner as in Example 1, except that 3.20 g of neodymium chloride hexahydrate was replaced by 3.26 g of samarium chloride hexahydrate. The supported catalyst 2 had a copper element concentration of 2.5 wt %, a potassium element concentration of 1.5 wt % and a samarium element concentration of 2.5 wt %. The average sphericity was 0.921, the average particle diameter was 216.8 μm, the particle density was 0.661 g/ml, and the terminal velocity calculated by the Stoke's law was 0.939 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 3

A supported catalyst 3 was prepared in the same manner as in Example 1, except that 3.20 g of neodymium chloride hexahydrate was replaced by 3.34 g of praseodymium chloride heptahydrate. The supported catalyst 3 had a copper element concentration of 2.5 wt %, a potassium element concentration of 1.5 wt % and a praseodymium element concentration of 2.5 wt %. The average sphericity was 0.921, the average particle diameter was 215.6 μm, the particle density was 0.677 g/ml, and the terminal velocity calculated by the Stoke's law was 0.951 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 4

A supported catalyst 4 was prepared in the same manner as in Example 1, except that 3.20 g of neodymium chloride hexahydrate was replaced by 3.27 g of europium chloride hexahydrate. The supported catalyst 4 had a copper element concentration of 2.5 wt %, a potassium element concentration of 1.5 wt % and a europium element concentration of 2.5 wt %. The average sphericity was 0.919, the average particle diameter was 214.7 μm, the particle density was 0.671 g/ml, and the terminal velocity calculated by the Stoke's law was 0.934 m/sec. The supported catalyst 4 was tested by the aforementioned methods to evaluate the hydrogen chloride conversion and the fluidity. Table 2 describes the results together with the bond dissociation energy with oxygen of the lanthanoid element in the supported catalyst.

Example 5

A supported catalyst 5 was prepared in the same manner as in Example 1, except that 3.20 g of neodymium chloride hexahydrate was replaced by 3.32 g of gadolinium chloride hexahydrate. The supported catalyst 5 had a copper element concentration of 2.5 wt %, a potassium element concentration of 1.5 wt % and a gadolinium element concentration of 2.5 wt %. The average sphericity was 0.917, the average particle diameter was 218.1 μm, the particle density was 0.679 g/ml, and the terminal velocity calculated by the Stoke's law was 0.976 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 6

A supported catalyst 6 was prepared in the same manner as in Example 1, except that 3.20 g of neodymium chloride hexahydrate was replaced by 3.36 g of dysprosium chloride hexahydrate. The supported catalyst 6 had a copper element concentration of 2.5 wt %, a potassium element concentration of 1.5 wt % and a dysprosium element concentration of 2.5 wt %. The average sphericity was 0.918, the average particle diameter was 216.2 µm, the particle density was 0.681 g/ml, and the terminal velocity calculated by the Stoke's law was 0.962 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 7

A supported catalyst 7 was prepared in the same manner as in Example 1, except that the spherical silica was changed from the silica carrier 1 to silica carrier 2 (Q-15 manufactured by FUJI SILYSIA CHEMICAL LTD., particle size distribution: 75 to 150 µm, properties described in the analysis sheet from the manufacturer: average pore diameter 15 nm, average particle diameter 100 µm, bulk density 0.4 g/ml, pore volume 1.2 ml/g). The supported catalyst 7 had a copper element concentration of 2.5 wt %, a potassium element concentration of 1.5 wt % and a neodymium element concentration of 2.5 wt %. The average sphericity was 0.923, the average particle diameter was 108.9 µm, the particle density was 0.656 g/ml, and the terminal velocity calculated by the Stoke's law was 0.235 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 8

A supported catalyst 8 was prepared in the same manner as in Example 1, except that the spherical silica was changed from the silica carrier 1 to the silica carrier 2 and that 3.20 g of neodymium chloride hexahydrate was replaced by 3.26 g of samarium chloride hexahydrate. The supported catalyst 8 had a copper element concentration of 2.5 wt %, a potassium element concentration of 1.5 wt % and a samarium element concentration of 2.5 wt %. The average sphericity was 0.922, the average particle diameter was 112.5 µm, the particle density was 0.644 g/ml, and the terminal velocity calculated by the Stoke's law was 0.246 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 9

A supported catalyst 9 was prepared in the same manner as in Example 1, except that the spherical silica was changed from the silica carrier 1 to silica carrier 3 (Q-6 manufactured by FUJI SILYSIA CHEMICAL LTD., particle size distribution: 75 to 150 µm, properties described in the analysis sheet from the manufacturer: average pore diameter 6 nm, average particle diameter 100 µm, bulk density 0.5 g/ml, pore volume 0.8 ml/g). The supported catalyst 9 had a copper element concentration of 2.5 wt %, a potassium element concentration of 1.5 wt % and a neodymium element concentration of 2.5 wt %. The average sphericity was 0.929, the average particle diameter was 111.4 µm, the particle density was 0.886 g/ml, and the terminal velocity calculated by the Stoke's law was 0.332 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 10

A supported catalyst 10 was prepared in the same manner as in Example 1, except that the spherical silica was changed from the silica carrier 1 to the silica carrier 3 and that 3.20 g of neodymium chloride hexahydrate was replaced by 3.26 g of samarium chloride hexahydrate. The supported catalyst 10 had a copper element concentration of 2.5 wt %, a potassium element concentration of 1.5 wt % and a samarium element concentration of 2.5 wt %. The average sphericity was 0.931, the average particle diameter was 109.2 µm, the particle density was 0.879 g/ml, and the terminal velocity calculated by the Stoke's law was 0.317 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 11

The silica carrier 1 was calcined at 500° C. in air for 2 hours. Separately, a glass flask (1 L) was charged with 150 g of water, 1.68 g of cupric chloride (special grade, Wako Pure Chemical Industries Ltd.), 1.86 g of neodymium chloride hexahydrate (special grade, Wako Pure Chemical Industries Ltd.) and 0.90 g of potassium chloride (special grade, Wako Pure Chemical Industries Ltd.). These compounds were formed into an aqueous solution. The calcined silica carrier 1 weighing 50.0 g was added to the aqueous solution, and the liquid was evaporated to dryness at 80° C. in a rotary evaporator. The residue was then calcined in air at 250° C. for 3 hours, thereby obtaining a supported catalyst 11. The supported catalyst 11 had a copper element concentration of 1.5 wt %, a potassium element concentration of 0.9 wt % and a neodymium element concentration of 1.5 wt %. The average sphericity was 0.926, the average particle diameter was 211.1 µm, the particle density was 0.640 g/ml, and the terminal velocity calculated by the Stoke's law was 0.862 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 12

A supported catalyst 12 was prepared in the same manner as in Example 11, except that 1.86 g of neodymium chloride hexahydrate was replaced by 1.89 g of samarium chloride hexahydrate. The supported catalyst 12 had a copper element concentration of 1.5 wt %, a potassium element concentration of 0.9 wt % and a samarium element concentration of 1.5 wt %. The average sphericity was 0.925, the average particle diameter was 220.1 µm, the particle density was 0.636 g/ml, and the terminal velocity calculated by the Stoke's law was 0.931 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 13

A glass flask (200 mL) was charged with 25 g of water, 2.89 g of cupric chloride (special grade, Wako Pure Chemical Industries Ltd.), 3.20 g of neodymium chloride hexahydrate (special grade, Wako Pure Chemical Industries Ltd.) and 1.53 g of potassium chloride (special grade, Wako Pure Chemical Industries Ltd.). The mixture was stirred to give an aqueous solution 1. Separately, a glass mixer (1 L) was charged with 50.0 g of the silica carrier 1 which had been calcined at 500° C. for 2 hours, and the aqueous solution 1 was sprayed thereto while performing stirring. After the completion of the spraying, the wet carrier was dried at 95° C. and a reduced pressure in a rotary evaporator, thereby obtaining a supported catalyst 13. The supported catalyst 13 had a copper element concentration of 2.5 wt %, a potassium element concentration of 1.5 wt % and a neodymium element concentration of 2.5 wt %. The average sphericity was 0.919, the average particle diameter was 217.7 µm, the particle density was 0.683 g/ml, and the terminal velocity calculated by the Stoke's law was 0.978 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 14

A supported catalyst 14 was prepared in the same manner as in Example 13, except that 3.20 g of neodymium chloride hexahydrate was replaced by 3.26 g of samarium chloride hexahydrate. The supported catalyst 14 had a copper element concentration of 2.5 wt %, a potassium element concentration of 1.5 wt % and a samarium element concentration of 2.5 wt %. The average sphericity was 0.924, the average particle diameter was 216.9 µm, the particle density was 0.661 g/ml, and the terminal velocity calculated by the Stoke's law was 0.940 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 15

A supported catalyst 15 was prepared in the same manner as in Example 1, except that potassium chloride was replaced by sodium chloride. The supported catalyst 15 had a copper element concentration of 2.5 wt %, a sodium element concentration of 1.5 wt % and a neodymium element concentration of 2.5 wt %. The average sphericity was 0.913, the average particle diameter was 219.2 µm, the particle density was 0.666 g/ml, and the terminal velocity calculated by the Stoke's law was 0.967 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 16

A supported catalyst 16 was prepared in the same manner as in Example 1, except that potassium chloride was replaced by sodium chloride and that 3.20 g of neodymium chloride hexahydrate was replaced by 3.26 g of samarium chloride hexahydrate. The supported catalyst 16 had a copper element concentration of 2.5 wt %, a sodium element concentration of 1.5 wt % and a samarium element concentration of 2.5 wt %. The average sphericity was 0.914, the average particle diameter was 218.7 µm, the particle density was 0.672 g/ml, and the terminal velocity calculated by the Stoke's law was 0.971 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 17

A supported catalyst 17 was prepared in the same manner as in Example 1, except that 3.20 g of neodymium chloride hexahydrate was replaced by 1.63 g of samarium chloride hexahydrate and 1.67 g of praseodymium chloride heptahydrate. The supported catalyst 17 had a copper element concentration of 2.5 wt %, a potassium element concentration of 1.5 wt %, a samarium element concentration of 1.25 wt % and a praseodymium element concentration of 1.25 wt %. The average sphericity was 0.911, the average particle diameter was 216.2 µm, the particle density was 0.675 g/ml, and the terminal velocity calculated by the Stoke's law was 0.953 m/sec. The supported catalyst was tested by the aforementioned methods to evaluate the hydrogen chloride conversion and the fluidity. Table 2 describes the results together with the bond dissociation energy with oxygen of the lanthanoid elements in the supported catalyst.

Example 18

A supported catalyst 18 was prepared in the same manner as in Example 1, except that 3.20 g of neodymium chloride hexahydrate was replaced by 1.63 g of samarium chloride hexahydrate and 1.67 g of lanthanum chloride heptahydrate. The supported catalyst 18 had a copper element concentration of 2.5 wt %, a potassium element concentration of 1.5 wt %, a samarium element concentration of 1.25 wt % and a lanthanum element concentration of 1.25 wt %. The average sphericity was 0.913, the average particle diameter was 218.5 µm, the particle density was 0.677 g/ml, and the terminal velocity calculated by the Stoke's law was 0.977 m/sec. The supported catalyst was tested by the aforementioned methods to evaluate the hydrogen chloride conversion and the fluidity. Table 2 describes the results together with the bond dissociation energy with oxygen of the lanthanoid elements in the supported catalyst.

Example 19

The catalyst 2 prepared in Example 2 was tested by the catalytic reaction testing method as described hereinabove, except that the gases used were hydrogen chloride at 90.0 Nml/min, oxygen at 45.0 Nml/min, and carbon monoxide at 3.0 Nml/min. The hydrogen chloride conversion and the fluidity were measured and evaluated in the same manner. The results are described in Table 2.

Example 20

The catalyst 2 prepared in Example 2 was tested by the catalytic reaction testing method as described hereinabove, except that the gases used were hydrogen chloride at 90.0

Nml/min, oxygen at 45.0 Nml/min, and carbon monoxide at 6.0 Nml/min. The hydrogen chloride conversion and the fluidity were measured and evaluated in the same manner. The results are described in Table 2.

Example 21

The silica carrier 1 was calcined at 500° C. in air for 2 hours. A glass flask (1 L) was charged with 150 g of water, 1.77 g of cupric chloride (special grade, Wako Pure Chemical Industries Ltd.), 5.98 g of samarium chloride hexahydrate and 2.83 g of potassium chloride (special grade, Wako Pure Chemical Industries Ltd.). These compounds were formed into an aqueous solution. The calcined silica carrier 1 weighing 50.0 g was added to the aqueous solution, and the liquid was evaporated to dryness at 80° C. in a rotary evaporator. The residue was then calcined in air at 250° C. for 3 hours, thereby obtaining a supported catalyst 19. The supported catalyst 19 had a copper element concentration of 1.5 wt %, a potassium element concentration of 2.7 wt % and a samarium element concentration of 4.5 wt %. The average sphericity was 0.915, the average particle diameter was 213.4 μm, the particle density was 0.685 g/ml, and the terminal velocity calculated by the Stoke's law was 0.943 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 22

The silica carrier 1 was calcined at 500° C. in air for 2 hours. A glass flask (1 L) was charged with 150 g of water, 6.20 g of cupric chloride (special grade, Wako Pure Chemical Industries Ltd.), 6.86 g of neodymium chloride hexahydrate (special grade, Wako Pure Chemical Industries Ltd.) and 3.30 g of potassium chloride (special grade, Wako Pure Chemical Industries Ltd.). These compounds were formed into an aqueous solution. The calcined silica carrier 1 weighing 50.0 g was added to the aqueous solution, and the liquid was evaporated to dryness at 80° C. in a rotary evaporator. The residue was then calcined in air at 250° C. for 3 hours, thereby recovering 63.63 g of a catalyst. The recovered catalyst was physically mixed with the equal weight (63.63 g) of the silica carrier 1. Thus, a supported catalyst 20 was obtained. The supported catalyst 20 had a copper element concentration of 2.5 wt %, a potassium element concentration of 1.5 wt % and a neodymium element concentration of 2.5 wt %. The average sphericity was 0.923, the average particle diameter was 213.8 μm, the particle density was 0.659 g/ml, and the terminal velocity calculated by the Stoke's law was 0.910 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Example 23

A supported catalyst 21 was prepared in the same manner as in Example 22, except that 6.86 g of neodymium chloride hexahydrate was replaced by 6.98 g of samarium chloride hexahydrate. The supported catalyst 21 had a copper element concentration of 2.5 wt %, a potassium element concentration of 1.5 wt % and a samarium element concentration of 2.5 wt %. The average sphericity was 0.921, the average particle diameter was 216.7 μm, the particle density was 0.662 g/ml, and the terminal velocity calculated by the Stoke's law was 0.939 m/sec. The supported catalyst was tested by the aforementioned methods to evaluate the hydrogen chloride conversion and the fluidity. Table 2 describes the results together with the bond dissociation energy with oxygen of the lanthanoid element in the supported catalyst.

Comparative Example 1

A supported catalyst 22 was prepared in the same manner as in Example 1, except that 3.20 g of neodymium chloride hexahydrate was replaced by 3.31 g of lanthanum chloride heptahydrate. The supported catalyst 22 had a copper element concentration of 2.5 wt %, a potassium element concentration of 1.5 wt % and a lanthanum element concentration of 2.5 wt %. The average sphericity was 0.914, the average particle diameter was 220.2 μm, the particle density was 0.678 g/ml, and the terminal velocity calculated by the Stoke's law was 0.994 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 2

A supported catalyst 23 was prepared in the same manner as in Example 11, except that 1.86 g of neodymium chloride hexahydrate was replaced by 1.93 g of lanthanum chloride heptahydrate. The supported catalyst 23 had a copper element concentration of 1.5 wt %, a potassium element concentration of 0.9 wt % and a lanthanum element concentration of 1.5 wt %. The average sphericity was 0.919, the average particle diameter was 210.7 μm, the particle density was 0.643 g/ml, and the terminal velocity calculated by the Stoke's law was 0.862 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 3

A supported catalyst 24 was prepared in the same manner as in Example 1, except that 3.20 g of neodymium chloride hexahydrate was replaced by 3.45 g of ytterbium chloride hexahydrate. The supported catalyst 24 had a copper element concentration of 2.5 wt %, a potassium element concentration of 1.5 wt % and an ytterbium element concentration of 2.5 wt %. The average sphericity was 0.912, the average particle diameter was 217.2 μm, the particle density was 0.672 g/ml, and the terminal velocity calculated by the Stoke's law was 0.958 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 4

A supported catalyst 25 was prepared in the same manner as in Example 9, except that 1.86 g of neodymium chloride hexahydrate was replaced by 2.01 g of ytterbium chloride hexahydrate. The supported catalyst 25 had a copper element concentration of 1.5 wt %, a potassium element concentration of 0.9 wt % and an ytterbium element concentration of 1.5 wt %. The average sphericity was 0.917, the average particle diameter was 209.9 μm, the particle density was 0.639 g/ml, and the terminal velocity calculated by the Stoke's law was 0.851 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 5

The silica carrier 1 was calcined at 500° C. in air for 2 hours. A glass flask (1 L) was charged with 150 g of water, 6.20 g of cupric chloride (special grade, Wako Pure Chemical Industries Ltd.), 6.86 g of neodymium chloride hexahydrate (special grade, Wako Pure Chemical Industries Ltd.) and 3.30 g of potassium chloride (special grade, Wako Pure Chemical Industries Ltd.). These compounds were formed into an aqueous solution. The calcined silica carrier 1 weighing 50.0 g was added to the aqueous solution, and the liquid was evaporated to dryness at 80° C. in a rotary evaporator. The residue was then calcined in air at 250° C. for 3 hours, thereby obtaining a supported catalyst 26. The supported catalyst 26 had a copper element concentration of 5.0 wt %, a potassium element concentration of 3.0 wt % and a neodymium element concentration of 5.0 wt %. The average sphericity was 0.915, the average particle diameter was 221.3 μm, the particle density was 0.741 g/ml, and the terminal velocity calculated by the Stoke's law was 1.097 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 6

A supported catalyst 27 was prepared in the same manner as in Comparative Example 5, except that 6.86 g of neodymium chloride hexahydrate was replaced by 6.98 g of samarium chloride hexahydrate. The supported catalyst 27 had a copper element concentration of 5.0 wt %, a potassium element concentration of 3.0 wt % and a samarium element concentration of 5.0 wt %. The average sphericity was 0.911, the average particle diameter was 219.2 μm, the particle density was 0.746 g/ml, and the terminal velocity calculated by the Stoke's law was 1.083 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 7

A supported catalyst 28 was prepared in the same manner as in Example 1, except that the carrier was changed from the silica carrier 1 to silica carrier 4 (G-10 manufactured by FUJI SILYSIA CHEMICAL LTD., particle size distribution: 75 to 500 μm, properties described in the analysis sheet from the manufacturer: average pore diameter 10 nm, pore volume 1.3 ml/g). The supported catalyst 28 had a copper element concentration of 2.5 wt %, a potassium element concentration of 1.5 wt % and a neodymium element concentration of 2.5 wt %. The average sphericity was 0.760, the average particle diameter was 303.2 μm, the particle density was 0.550 g/ml, and the terminal velocity calculated by the Stoke's law was 1.527 m/sec. The supported catalyst was tested by the aforementioned method in an attempt to evaluate the hydrogen chloride conversion. However, the catalyst layer adhered together and the measurement of the hydrogen chloride conversion at 380° C. was instable and inaccurate. The difference in temperature in the glass reaction tube during the evaluation is described in Table 3 together with the bond dissociation energy with oxygen of the lanthanoid element in the supported catalyst.

Comparative Example 8

A supported catalyst 29 was prepared in the same manner as in Example 1, except that the carrier was changed from the silica carrier 1 to the silica carrier 4 and that 3.20 g of neodymium chloride hexahydrate was replaced by 3.26 g of samarium chloride hexahydrate. The supported catalyst 29 had a copper element concentration of 2.5 wt %, a potassium element concentration of 1.5 wt % and a samarium element concentration of 2.5 wt %. The average sphericity was 0.757, the average particle diameter was 302.1 μm, the particle density was 0.545 g/ml, and the terminal velocity calculated by the Stoke's law was 1.502 m/sec. The supported catalyst was tested by the aforementioned method in an attempt to evaluate the hydrogen chloride conversion. However, the catalyst layer adhered together and the measurement of the hydrogen chloride conversion at 380° C. was instable and inaccurate. The difference in temperature in the glass reaction tube during the evaluation is described in Table 3 together with the bond dissociation energy with oxygen of the lanthanoid element in the supported catalyst.

Comparative Example 9

A supported catalyst 30 was prepared in the same manner as in Example 1, except that the carrier was changed from the silica carrier 1 to silica carrier 5 (G-10 manufactured by FUJI SILYSIA CHEMICAL LTD., particle size distribution: 75 to 150 μm, properties described in the analysis sheet from the manufacturer: average pore diameter 10 nm, pore volume 1.3 ml/g). The supported catalyst 30 had a copper element concentration of 2.5 wt %, a potassium element concentration of 1.5 wt % and a neodymium element concentration of 2.5 wt %. The average sphericity was 0.729, the average particle diameter was 202.3 μm, the particle density was 0.523 g/ml, and the terminal velocity calculated by the Stoke's law was 0.646 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 10

A supported catalyst 31 was prepared in the same manner as in Example 1, except that the carrier was changed from the silica carrier 1 to the silica carrier 5 and that 3.20 g of neodymium chloride hexahydrate was replaced by 3.26 g of samarium chloride hexahydrate. The supported catalyst 31 had a copper element concentration of 2.5 wt %, a potassium element concentration of 1.5 wt % and a samarium element concentration of 2.5 wt %. The average sphericity was 0.732, the average particle diameter was 199.8 μm, the particle density was 0.517 g/ml, and the terminal velocity calculated by the Stoke's law was 0.623 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

Comparative Example 11

50 g of a microspherical fluidized-bed chromium oxide catalyst containing 75 wt % of chromia and 25 wt % of silica was impregnated in 25 ml of an aqueous solution of 6.71 g of $CuCl_2.2H_2O$, 2.85 g of KCl and 7.79 g of $La(NO_3)_3.6H_2O$, and was thereafter calcined at 510° C. for 5 hours to give a supported catalyst 32 containing silicon oxide and chromium oxide. This catalyst preparation was made with reference to the methods described in JP-A-S61-275104 and Japanese Patent No. 3270670. The supported catalyst 32 had an average sphericity of 0.863, a particle density of 1.683 g/ml, an average particle diameter of 78.2 μm and a terminal velocity calculated by the Stoke's law of 0.311 m/sec. The supported catalyst was tested by the aforementioned methods to evaluate the hydrogen chloride conversion and the fluidity. Table 3 describes the results together with the bond dissociation energy with oxygen of the lanthanoid element in the supported catalyst.

In the supported catalysts obtained in Examples and Comparative Examples, the average pore diameter and the pore volume were 90% or more the values of the carriers used.

TABLE 2

|  | Supported catalyst No. | Bond dissociation energy of lanthanoid element with oxygen @298K (kcal/mol) | Average sphericity | Particle density (g/ml) | Average particle diameter (μm) | Terminal velocity (m/sec) | Hydrogen chloride conversion (%) | Temperature difference (° C.) | Fluidity |
|---|---|---|---|---|---|---|---|---|---|
| Ex. 1 | 1 | 168 | 0.918 | 0.683 | 213.4 | 0.940 | 79.8 | −1.0 | Good |
| Ex. 2 | 2 | 135 | 0.921 | 0.661 | 216.8 | 0.939 | 78.6 | −0.9 | Good |
| Ex. 3 | 3 | 180 | 0.921 | 0.677 | 215.6 | 0.951 | 74.9 | −1.1 | Good |
| Ex. 4 | 4 | 115 | 0.919 | 0.671 | 214.7 | 0.934 | 74.9 | −0.1 | Good |
| Ex. 5 | 5 | 172 | 0.917 | 0.679 | 218.1 | 0.976 | 64.2 | −0.4 | Good |
| Ex. 6 | 6 | 145 | 0.918 | 0.681 | 216.2 | 0.962 | 69.4 | −0.6 | Good |
| Ex. 7 | 7 | 168 | 0.923 | 0.656 | 108.9 | 0.235 | 78.5 | −0.6 | Good |
| Ex. 8 | 8 | 135 | 0.922 | 0.644 | 112.5 | 0.246 | 78.2 | −0.5 | Good |
| Ex. 9 | 9 | 168 | 0.929 | 0.886 | 111.4 | 0.332 | 77.6 | −1.1 | Good |
| Ex. 10 | 10 | 135 | 0.931 | 0.879 | 109.2 | 0.317 | 77.5 | −0.8 | Good |
| Ex. 11 | 11 | 168 | 0.926 | 0.640 | 211.1 | 0.862 | 73.2 | −0.8 | Good |
| Ex. 12 | 12 | 135 | 0.925 | 0.636 | 220.1 | 0.931 | 74.0 | −1.0 | Good |
| Ex. 13 | 13 | 168 | 0.919 | 0.683 | 217.7 | 0.978 | 79.8 | −1.0 | Good |
| Ex. 14 | 14 | 135 | 0.924 | 0.661 | 216.9 | 0.940 | 78.6 | −0.9 | Good |
| Ex. 15 | 15 | 168 | 0.913 | 0.666 | 219.2 | 0.967 | 68.9 | 0.5 | Good |
| Ex. 16 | 16 | 135 | 0.914 | 0.672 | 218.7 | 0.971 | 67.9 | 0.2 | Good |
| Ex. 17 | 17 | 135/180 | 0.911 | 0.675 | 216.2 | 0.953 | 74.1 | −0.6 | Good |
| Ex. 18 | 18 | 135/191 | 0.913 | 0.677 | 218.5 | 0.977 | 68.5 | −0.6 | Good |
| Ex. 19 | 2 | 135 | 0.921 | 0.661 | 216.8 | 0.939 | 77.5 | −0.6 | Good |
| Ex. 20 | 2 | 135 | 0.921 | 0.661 | 216.8 | 0.939 | 76.9 | −0.8 | Good |
| Ex. 21 | 19 | 135 | 0.915 | 0.685 | 213.4 | 0.943 | 71.4 | −0.7 | Good |
| Ex. 22 | 20 | 168 | 0.923 | 0.659 | 213.8 | 0.910 | 79.4 | −0.2 | Good |
| Ex. 23 | 21 | 135 | 0.921 | 0.662 | 216.7 | 0.939 | 78.1 | −0.3 | Good |

TABLE 3

|  | Supported catalyst No. | Bond dissociation energy of lanthanoid element with oxygen @298K (kcal/mol) | Average sphericity | Particle density (g/ml) | Average particle diameter (μm) | Terminal velocity (m/sec) | Hydrogen chloride conversion (%) | Temperature difference (° C.) | Fluidity |
|---|---|---|---|---|---|---|---|---|---|
| Comp. Ex. 1 | 22 | 191 | 0.914 | 0.678 | 220.2 | 0.994 | 55.6 | 1.4 | Good |
| Comp. Ex. 2 | 23 | 191 | 0.919 | 0.643 | 210.7 | 0.862 | 48.9 | 0.9 | Good |
| Comp. Ex. 3 | 24 | 95 | 0.912 | 0.672 | 217.2 | 0.958 | 56.9 | 1.1 | Good |
| Comp. Ex. 4 | 25 | 95 | 0.917 | 0.639 | 209.9 | 0.851 | 50.2 | 0.3 | Good |
| Comp. Ex. 5 | 26 | 168 | 0.915 | 0.741 | 221.3 | 1.097 | 79.7 | 5.3 | Bad |
| Comp. Ex. 6 | 27 | 135 | 0.911 | 0.746 | 219.2 | 1.083 | 79.3 | 4.2 | Bad |
| Comp. Ex. 7 | 28 | 168 | 0.760 | 0.550 | 303.2 | 1.527 | Immeasurable | 8.2 | Bad |
| Comp. Ex. 8 | 29 | 135 | 0.757 | 0.545 | 302.1 | 1.502 | Immeasurable | 9.5 | Bad |
| Comp. Ex. 9 | 30 | 168 | 0.729 | 0.523 | 202.3 | 0.646 | 69.9 | 4.1 | Bad |
| Comp. Ex. 10 | 31 | 135 | 0.732 | 0.517 | 199.8 | 0.623 | 70.9 | 3.3 | Bad |
| Comp. Ex. 11 | 32 | 191 | 0.863 | 1.683 | 78.2 | 0.311 | 51.9 | 1.0 | Good |

INDUSTRIAL APPLICABILITY

The chlorine production catalysts of the invention show high catalytic activity and long catalyst life, are inexpensive and can be supplied stably, and maintain high fluidity over a long term without adhering together and are thus suited for use in a reaction in a fluidized-bed reactor. According to the chlorine production process using a fluidized-bed reactor of the invention, chlorine can be produced stably, continuously, efficiently and more economically over a long term.

REFERENCE SIGNS LIST

1 FORMED GAS
2 GLASS REACTION TUBE (INNER DIAMETER: 16 mm)
3 HEATER
4 CATALYST LAYER
5 GLASS FILTER
6 QUARTZ SAND
7 MATERIAL GAS

The invention claimed is:

1. A chlorine production process comprising oxidizing hydrogen chloride with oxygen in a fluidized-bed reactor in the presence of a chlorine production catalyst,
wherein the chlorine production catalyst comprises spherical particles containing copper element (A), an alkali metal element (B) and a lanthanoid element (C) and has an average sphericity of 0.90 or more,
wherein the lanthanoid element (C) has a bond dissociation energy with oxygen at 298 K of 100 to 185 kcal/mol,
wherein the content of the copper element (A) in the catalyst is 0.3 wt % to 4.5 wt %,
wherein a terminal velocity of the catalyst in air calculated by the Stoke's law below is 0.10 m/sec to 1.0 m/sec and a particle density is 0.4 g/ml to 1.2 g/ml:

Terminal velocity $u_t = g(\rho_s - \rho_g)d_p^2/18\mu$ wherein g: gravity acceleration $\rho_s$: particle density, $\rho_g$: gas density, $d_p$: average particle diameter, $\mu$: gas viscosity),
wherein a gas space velocity in the fluidized-bed reactor is 0.01 m/sec to 1.0 m/sec and the gas space velocity is not more than the terminal velocity of the catalyst.

2. The chlorine production process according to claim 1, wherein the weight ratio of the copper element (A) and the alkali metal element (B) is in the range of 1:0.2 to 1:4.0, and the weight ratio of the copper element (A) and the lanthanoid element (C) is in the range of 1:0.2 to 1:6.0.

3. The chlorine production process according to claim 1, wherein the weight ratio of the copper element (A) and the alkali metal element (B) is in the range of 1:0.2 to 1:2.0, and the weight ratio of the copper element (A) and the lanthanoid element (C) is in the range of 1:0.2 to 1:3.0.

4. The chlorine production process according to claim 1, wherein the lanthanoid element (C) is at least one selected from the group consisting of praseodymium (Pr), neodymium (Nd), samarium (Sm), europium (Eu), gadolinium (Gd) and dysprosium (Dy).

* * * * *